United States Patent [19]

Yates, III et al.

[11] Patent Number: 4,745,157

[45] Date of Patent: May 17, 1988

[54] IMPACT MODIFICATION OF POLYPHENYLENE ETHER-POLYAMIDE COMPOSITIONS

[75] Inventors: John B. Yates, III, Glenmont; Timothy J. Ullman, Clifton Park, both of N.Y.

[73] Assignee: General Electric Company, Schenectady, N.Y.

[21] Appl. No.: 943,222

[22] Filed: Dec. 18, 1986

[51] Int. Cl.$^4$ .............................................. C08L 71/04
[52] U.S. Cl. ........................................ 525/92; 525/133; 525/905
[58] Field of Search ................................ 525/92, 133

[56] References Cited

U.S. PATENT DOCUMENTS 4,315,086  2/1982  Ueno et al. .

FOREIGN PATENT DOCUMENTS

85/5372  12/1985  PCT Int'l Appl. .

Primary Examiner—Lewis T. Jacobs
Assistant Examiner—A. Carrillo
Attorney, Agent, or Firm—William H. Pittman; James C. Davis, Jr.; James Magee, Jr.

[57] ABSTRACT

Resinous compositions having excellent impact resistance are obtained by initially blending at least one polyphenylene ether or a blend thereof with at least one polystyrene, a functionalizing compound such as maleic anhydride or fumaric acid and an unfunctionalized elastomeric olefin copolymer such as an EPDM, and subsequently blending the resulting product with at least one polyamide.

24 Claims, No Drawings

IMPACT MODIFICATION OF POLYPHENYLENE ETHER-POLYAMIDE COMPOSITIONS

This invention relates to the preparation of polyphenylene ether-polyamide compositions having numerous advantageous properties, including excellent impact resistance.

The polyphenylene ether resins are characterized by a unique combination of chemical, physical and electrical properties over a temperature range of more than 350° C., extending from a brittle point of about −170° C. to a heat distortion temperature of about 190° C. This combination of properties renders the polyphenylene ethers suitable for a broad range of applications. However, in spite of the aforementioned beneficial properties, the usefulness of the polyphenylene ether resins is limited as a consequence of their poor processability, impact resistance and chemical resistance.

U.S. Pat. No. 3,379,792 discloses polymer blends wherein the processability of polyphenylene ether resins may be improved by blending therewith from 0.1 to 25% by weight of a polyamide. However, the advantages of this invention are limited by the fact that when the concentration of the polyamide exceeds 20% by weight, appreciable losses in other physical properties result. Specifically, there is no, or at best poor, compatibility between the polyphenylene ether and the polyamide. Consequently, phase separation of the resins occurs on molding or the molded article is inferior in mechanical properties.

In U.S. Pat. No. 4,315,086, there are disclosed polyphenylene ether blends having improved chemical resistance without a loss of other mechanical properties by blending therewith a polyamide and a specific compound selected from the group consisting essentially of liquid diene polymers, epoxy compounds and compounds having in the molecule both of (i) an ethylenic carbon-carbon double bond or carbon-carbon triple bond and (ii) a carboxylic acid, acid anhydride, acid amide, imide, carboxylic acid ester, amino or hydroxyl group. Copending, commonly owned application Ser. No. 885,497, filed July 14, 1986, and corresponding PCT application 87100540 disclose the use of the same compounds to functionalize polyphenylene ethers for compatibilization with polyamides.

The incorporation of impact modifiers in polyphenylene ether, polyamide and polyphenylene ether-polyamide compositions, for the purpose of improving the impact strength thereof, is also known. Numerous suitable impact modifiers are disclosed in the patents and applications listed hereinabove and elsewhere. Suitable polyphenylene ether impact modifiers, for example, include diblock and triblock copolymers of vinyl aromatic compounds and conjugated dienes, which may be selectively hydrogenated. Such impact modifiers are also known to be useful in polyphenylene ether-polyamide compositions.

Many of the polyamide impact modifiers are polymers containing functionalization such as carboxylic acid, epoxy or nitrile groups. The use of simple unfunctionalized olefin polymers in polyamide or polyphenylene ether-polyamide systems is generally not very effective to increase impact strength.

The present invention provides a method for utilizing olefin copolymers as impact modifiers in polyphenylene ether-polyamide compositions. It also provides compositions of this type possessing numerous advantageous properties, including high impact strength.

In its broadest sense, the invention includes a method for preparing a resinous composition and the compositions so prepared. Said method comprises:

(I) intimately blending, at a temperature in the range of about 270°–350° C. (A) at least one polyphenylene ether, or a blend thereof with at least one polystyrene; (B) at least about 0.5 part by weight, per 100 parts of component A, of a functionalizing compound containing at least one carbon-carbon double or triple bond and at least one carboxylic acid group or functional derivative thereof; and (C) at least one unfunctionalized elastomeric olefin copolymer comprising a major proportion of structural units derived from ethylene and at least one $C_{3-8}$ 1-olefin; and (II) blending, at a temperature in the range of about 270°–350° C., the product of step I with (D) at least one polyamide.

The polyphenylene ethers used as component A in the present invention are a well known class of polymers. They are widely used in industry, especially as engineering plastics in applications requiring toughness and heat resistance. Since their discovery, they have given rise to numerous variations and modifications all of which are applicable to the present invention, including but not limited to those described hereinafter.

The polyphenylene ethers comprise a plurality of structural units having the formula

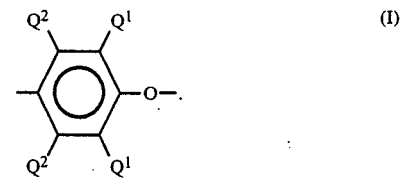

In each of said units independently, each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl, Preferably, any alkyl radicals are straight chain rather than branched. Most often, each $Q^1$ is alkyl or phenyl, especially $C_{1-4}$ alkyl, and each $Q^2$ is hydrogen. Suitable polyphenylene ethers are disclosed in a large number of patents.

Both homopolymer and copolymer polyphenylene ethers are included. Suitable homopolymers are those containing, for example, 2,6-dimethyl-1,4-phenylene ether units. Suitable copolymers include random copolymers containing such units in combination with (for example) 2,3,6-trimethyl-1,4-phenylene ether units. Many suitable random copolymers, as well as homopolymers, are disclosed in the patent literature.

Also included are polyphenylene ethers containing moieties which modify properties such as molecular weight, melt viscosity and/or impact strength. Such polymers are described in the patent literature and may be prepared by grafting onto the polyphenylene ether in known manner such vinyl monomers as acrylonitrile and vinylaromatic compounds (e.g., styrene), or such polymers as polystyrenes and elastomers. The product typically contains both grafted and ungrafted moieties. Other suitable polymers are the coupled polyphenylene ethers in which the coupling agent is reacted in known manner with the hydroxy groups of two polyphenylene ether chains to produce a higher molecular weight polymer containing the reaction product of the hydroxy groups and the coupling agent. Illustrative coupling agents are low molecular weight polycarbonates, quinones, heterocycles and formals.

The polyphenylene ether generally has a number average molecular weight within the range of about 3,000–40,000 and a weight average molecular weight within the range of about 20,000–80,000 as determined by gel permeation chromatography. Its intrinsic viscosity is most often in the range of about 0.35–0.6 dl./g., as measured in chloroform at 25° C.

The polyphenylene ethers are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly(2,6-dimethyl-1,4-phenylene ether), and 2,3,6-trimethylphenol (wherein each $Q^1$ and one $Q^2$ is methyl and the other $Q^2$ is hydrogen).

A variety of catalyst systems are known for the preparation of polyphenylene ethers by oxidative coupling. There is no particular limitation as to catalyst choice and any of the known catalysts can be used. For the most part, they contain at least one heavy metal compound such as a copper, manganese or cobalt compound, usually in combination with various other materials.

A first class of preferred catalyst systems consists of those containing a copper compound. Such catalysts are disclosed, for example, in U.S. Pat. Nos. 3,306,874, 3,306,875, 3,914,266 and 4,028,341. They are usually combinations of cuprous or cupric ions, halide (i.e., chloride, bromide or iodide) ions and at least one amine.

Catalyst systems containing manganese compounds constitute a second preferred class. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, ω-hydroxyoximes (monomeric and polymeric), o-hydroxyaryl oximes and β-diketones. Also useful are known cobalt-containing catalyst systems. Suitable manganese and cobalt-containing catalyst systems for polyphenylene ether preparation are known in the art by reason of disclosure in numerous patents and publications.

Particularly useful polyphenylene ethers for the purposes of this invention are those which comprise molecules having at least one of the end groups of the formulas

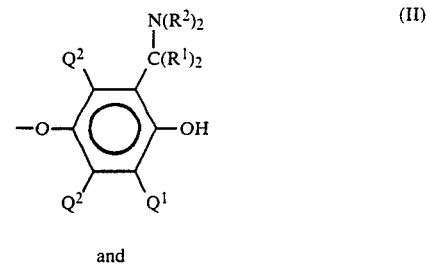

and

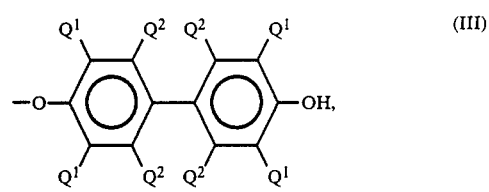

wherein $Q^1$ and $Q^2$ are as previously defined; each $R^1$ is independently hydrogen or alkyl, with the proviso that the total number of carbon atoms in both $R^1$ radicals is 6 or less; and each $R^2$ is independently hydrogen or a $C_{1-6}$ primary alkyl radical. Preferably, each $R^1$ is hydrogen and each $R^2$ is alkyl, especially methyl or n-butyl.

Polymers containing the aminoalkyl-substituted end groups of formula II may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the α-hydrogen atoms on one or more $Q^1$ radicals. The principal site of reaction is the $Q^1$ radical adjacent to the hydroxy group on the terminal unit of the polymer chain. During further processing and/or blending, the aminoalkyl-substituted end groups may undergo various reactions, probably involving a quinone methide-type intermediate of the formula

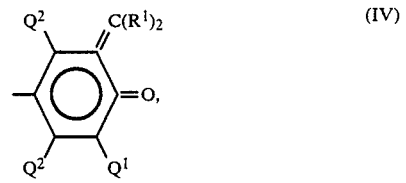

with numerous beneficial effects often including an increase in impact strength and compatibilization with other blend components. Reference is made to U.S. Pat. Nos. 4,054,553, 4,092,294, 4,477,649, 4,477,651 and 4,517,341, the disclosures of which are incorporated by reference herein.

Polymers with 4-hydroxybiphenyl end groups of formula III are typically obtained from reaction mixtures in which a by-product diphenoquinone of the formula

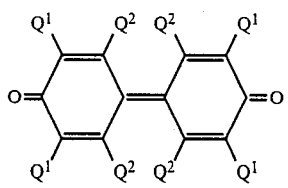

(V)

is present, especially in a copper-halide-secondary or tertiary amine system. In this regard, the disclosure of U.S. Pat. No. 4,477,649 is again pertinent as are those of U.S. Pat. No. 4,234,706 and 4,482,697, which are also incorporated by reference herein. In mixtures of this type, the diphenoquinone is utimately incorporated into the polymer in substantial proportions, largely as an end group.

In many polyphenylene ethers obtained under the above-described conditions, a substantial proportion of the polymer molecules, typically constituting as much as about 90% by weight of the polymer, contain end groups having one or frequently both of formulas II and III. It should be understood, however, that other end groups may be present and that the invention in its broadest sense may not be dependent on the molecular structures of the polyphenylene ether end groups.

It will be apparent to those skilled in the art from the foregoing that the polyphenylene ethers contemplated for use in the present invention include all those presently known, irrespective of variations in structural units or ancillary chemical features.

The use of certain functionalized polyphenylene ethers as component A is also contemplated. Suitable functionalizing compounds contain at least two functional groups selected from the group consisting of (1) carbon-carbon double and triple bonds and (2) carboxylic acid groups or functional derivatives thereof, at least one of said carboxylic acid groups or functional derivatives thereof being present. By "functional derivatives" is meant such materials as salts, esters, amides, anhydrides and imides.

At least one of the functional groups in the functionalizing compound is a carboxylic acid group or functional derivative thereof. More then two functional groups, typically three, are frequently present. Among the preferred functionalizing compounds are maleic anhydride, fumaric acid and trimellitic anhydride acid chloride (TAAC).

Functionalization of the polyphenylene ether may be achieved in solution or in the melt, by conventional methods. The method of functionalization is not a critical aspect of the invention.

The proportion of functionalizing compound is most conveniently expressed in terms of weight percent based on total polyphenylene ether present in component A. In general, about 0.01–5.0%, preferably about 0.1–3.0% and most preferably about 0.5–3.0% of functionalizing agent is employed on this basis.

The functionalizing compound may be reacted with the entire portion of polyphenylene ether to be used as component A, and this is frequently done when maleic anhydride, fumaric acid or similar compound is used. However, it is also within the scope of the invention to react the functionalizing compound with only a portion of the polyphenylene ether, typically about 1–50% by weight and preferably about 10–50% thereof. The functionalized polyphenylene ether is then blended with additional unfunctionalized polyphenylene ether to produce component A; this is frequently convenient when the functionalizing agent is TAAC.

The preparation of functionalized polyphenylene ethers is illustrated by the following examples. In all the examples herein, parts and percentages are by weight. The polyphenylene ether used in these and other examples was a poly-(2,6-dimethyl-1,4-phenylene ether) having a number average molecular weight of about 20,000 and an intrinsic viscosity in chloroform at 25° C. of 0.48–0.49 dl.g.

EXAMPLE 1

A mixture of 100 parts of polyphenylene ether and 1 part of maleic anhydride was extruded in Werner-Pfleiderer twin screw extruder at 300 rpm. and 285° C. The product was the desired maleic anhydride-functionalized polyphenylene ether.

EXAMPLE 2

A solution of 100 parts of polyphenylene ether, 2 parts of TAAC and 5 parts of dimethyl-n-butylamine in 500 parts of toluene was heated at 95° C. for 3 hours, with stirring. The product was precipitated by addition of methanol, redissolved in toluene and reprecipitated, and dried under reduced pressure. It was shown by infrared spectroscopy to be the desired anhydride-functionalized polyphenylene ether.

Component A may also contain at least one polystyrene. The term "polystyrene" as used herein includes polymers prepared by methods known in the art including bulk, suspension and emulsion polymerization, which contain at least 25% by weight of structural units derived from a monomer of the formula

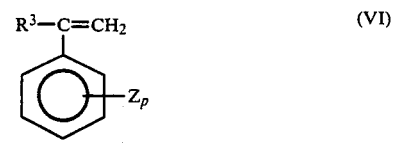

(VI)

wherein $R^3$ is hydrogen, lower alkyl or halogen; Z is vinyl, halogen or lower alkyl; and p is from 0 to 5. These resins include homopolymers of styrene, chlorostyrene and vinyltoluene, random copolymers of styrene with one or more monomers illustrated by acrylonitrile, butadiene, α-methylstyrene, ethylvinylbenzene, divinylbenzene and maleic anhydride, and rubber-modified polystyrenes comprising blends and grafts, wherein the rubber is a polybutadiene or a rubbery copolymer of about 98–70% styrene and about 2–30% diene monomer. These rubber-modified polystyrenes include high impact polystyrene, or HIPS.

The proportion of polystyrene in component A is not critical, since polyphenylene ethers and polystyrenes are miscible in all proportions. Component A will generally contain about 5–50% (by weight) polystyrene, if any.

The functionalizing compound employed as component B according to the invention contains, as previously described, one or more carbon-carbon double and/or triple bonds in combination with one or more carboxylic acid or carboxylic acid functional derivative groups. By "functional derivative" is meant such materials as salts, esters, amides, anhydrides and imides. Suitable functionalizing compounds include many of those disclosed in the aforementioned U.S. Pat. No. 4,315,086, as well as U.S. Pat. No. 4,600,741 and copending, commonly owned application Serial No. 885,497, filed July 14, 1986, and corresponding PCT application 87/00540, the disclosures of which are incorporated by reference herein.

Illustrative compounds of this type are maleic acid, fumaric acid, maleic anhydride, maleimides such as N-phenylmaleimide and 1,4-phenylene-bis-methylene-$\alpha,\alpha'$-bismaleimide, maleic hydrazide, methylnadic anhydride, fatty oils (e.g., soybean oil, tung oil, linseed oil, sesame oil) and unsaturated monocarboxylic acids such as acrylic acid, crotonic acid, methacrylic acid and oleic acid. The preferred functionalizing compounds are maleic anhydride and fumaric acid.

According to the invention, at least about 0.5 part by weight of component B is employed per 100 parts of component A. If less then this amount of component B is used, there is no appreciable improvement in impact strength. There is no particular advantage in using more then about 5 parts of component B per 100 parts of component A, and most often a maximum of 1.5 parts is used since higher proportions may cause darkening of the final resinous composition.

Component C is at least one unfunctionalized elastomeric olefin. The essential structural units therein are derived from ethylene and at least one $C_{3-8}$ 1-olefin such as propylene, 1-butene, 1-hexene and 1-octene, preferably propylene. The proportions of ethylene and the $C_{3-8}$ olefin are not critical, provided that together the structural units derived therefrom constitute a major proportion of the polymer.

Component C is preferably an EPDM polymer; that is, one containing units derived from ethylene, propylene and at least one non-conjugated diene such as ethylidene norbornene, 1,4-hexadiene or dicyclopentadiene. Many EPDM's are commercially available, and the use of any such commercially available polymer is within the scope of the invention.

In step I of the method of this invention, components A, B and C are intimately blended at a temperature in the range of about 270°–350° C. Conventional solution and melt blending operations may be employed, with melt blending being preferred by reason of its relative simplicity and effectiveness. Suitable melt blending methods include all those which can handle a molten viscous mass, including the use of extruders, Banbury mixers, rollers, kneaders and the like.

Step II is a blending step which additionally employs (D) at least one polyamide. Suitable polyamides may by made by any known method, including the polymerization of a monoamino-monocarboxylic acid or a lactam thereof having at least 2 carbon atoms between the amino and carboxylic acid group, of substantially equimolar proportions of a diamine which contains at least 2 carbon atoms between the amino groups and a dicarboxylic acid, or of a monoaminocarboxylic acid or a lactam thereof as defined above together with substantially equimolar proportions of a diamine and a dicarboxylic acid. (The term "substantially equimolar" proportions includes both strictly equimolar proportions and slight departures therefrom which are involved in conventional techniques for stabilizing the viscosity of the resultant polyamides.) The dicarboxylic acid may be used in the form of a functional derivative thereof, for example, an ester or acid chloride.

Examples of the aforementioned monoamino-monocarboxylic acids or lactams thereof which are useful in preparing the polyamides include those compounds containing from 2 to 16 carbon atoms between the amino and carboxylic acid groups, said carbon atoms forming a ring with the —CO—NH—group in the case of a lactam. As particular examples of aminocarboxylic acids and lactams there may be mentioned $\epsilon$-aminocaproic acid, butyrolactam, pivalolactam, $\epsilon$-caprolactam, capryllactam, enantholactam, undecanolactam, dodecanolactam and 3- and 4-aminobenzoic acids.

Diamines suitable for use in the preparation of the polyamides include the straight chain and branched chain alkyl, aryl and alkaryl diamines. Such diamines include, for example, those represented by the general formula

$$H_2N(CH_2)_nNH_2$$

wherein n is an integer of from 2 to 16. Illustrative diamines are trimethylenediamine, tetramethylenediamine, pentamethylenediamine, octamethylenediamine, hexamethylenediamine (which is often preferred), trimethylhexamethylenediamine, m-phenylenediamine and m-xylylenediamine.

The dicarboxylic acids may be represented by the formula

$$HOOC—Y—COOH$$

wherein Y is a divalent aliphatic or aromatic group containing at least 2 carbon atoms. Examples of aliphatic acids are sebacic acid, octadecanedioic acid, suberic acid, glutaric acid, pimelic acid and adipic acid. Aromatic acids, such as isophthalic and terephthalic acids, are preferred.

Typical examples of the polyamides or nylons, as these are often called, include, for example, polyamide-6, 6/6, 11, 12, 6/3, 6/4, 6/10 and 6/12 as well as polyamides from terephthalic acid and/or isophthalic acid and trimethylhexamethylenediamine; from adipic acid and m-xylylenediamines; from adipic acid, azelaic acid and 2,2-bis-(p-aminocyclohexyl)propane and from terephthalic acid and 4,4'-diaminodicyclohexylmethane. Mixtures and/or copolymers of two or more of the foregoing polyamides or prepolymers thereof, respectively, are also within the scope of the present invention. Preferred polyamides are polyamide-6, 6/6, 11 and 12, most preferably polyamide-6/6.

In general, the blending procedures useful in step II are melt blending procedures such as those previously described with reference to step I. It is within the scope of the invention to perform steps I and II successively by intitially blending and extruding components A, B and C and introducing component D at a second point in the extruder, downstream from the initial blending operation. The time and temperature required for blending are not particularly limited and can be determined according to the natures and proportions of the components.

The proportion of component B with respect to component A has been previously discussed. Components A and D can essentially be blended in all proportions, most often about 5–95% by weight and preferably about 25–75% of component A with the balance being component D. Component C, the impact modifier, is generally present in the amount of about 1–100% and preferably about 5–50% by weight, based on components A and D.

The method of this invention produces polyphenylene ether-polyamide compositions with significantly higher impact strengths than those of compositions prepared by the use of other blending and extrusion methods. For example, compositions obtained by initially extruding components A and B or C and subsequently adding the other components and reextruding have substantially lower impact strengths.

It is not known for certain why this is true. One possibility is that in step I, component B is grafted on component C as well as reacting to functionalize component A. (Such materials as maleic anhydride-grafted EPDM's are, of course, known in the art.) In any event, the invention is in no way dependent on theory.

The compositions of this invention may also contain other materials known in the art. These include reinforcing materials such as glass fibers, carbon fibers, mineral fillers and the like. Also included are such additives as flame retardants, foaming agents, colorants and stabilizers.

A particularly useful class of other materials, under many conditions, are art-recognized impact modifiers for the polyphenylene ether phase. These are typically polymers derived from the vinyl aromatic monomers. They include block copolymers comprising monoalkenyl arene (usually styrene) blocks and conjugated diene (e.g., butadiene or isoprene) blocks and represented as AB and ABA block copolymers. The conjugated diene blocks may be partially or entirely hydrogenated.

Suitable AB type block copolymers are disclosed in, for example, U.S. Pat. Nos. 3,078,254; 3,402,159; 3,297,793; 3,265,765 and 3,594,452 and U.K. Pat. No. 1,264,741, all incorporated herein by reference. Exemplary of typical species of AB block copolymers are:
polystyrene-polybutadiene (SBR)
polystyrene-polyisoprene and
poly($\alpha$-methylstyrene)-polybutadiene.

Such AB block copolymers are available commercially from a number of sources, including Phillips Petroleum under the trademark SOLPRENE.

Additionally, ABA triblock copolymers and processes for their production as well as hydrogenation, if desired, are disclosed in U.S. Pat. Nos. 3,149,182; 3,231,635; 3,462,162; 3,287,333; 3,595,942; 3,694,523 and 3,842,029, all incorporated herein by reference.

Examples of triblock copolymers include:
polystyrene-polybutadiene-polystyrene (SBS),
hydrogenated polystyrene-polybutadiene-polystyrene (SEBS),
polystyrene-polyisoprene-polystyrene (SIS),
poly($\alpha$-methylstyrene)-polybutadiene-poly($\alpha$-methylstyrene) and
poly($\alpha$-methylstyrene)-polyisoprene-poly($\alpha$-methylstyrene).

Particularly preferred triblock copolymers are available commercially as CARIFLEX®, KRATON D® and KRATON G® from Shell.

Such impact modifiers, when employed, are usually present in the amount of about 5-50 parts per 100 parts of component A.

The invention is illustrated by the following examples. All parts are by weight. The polyphenylene ether used was a poly-(2,6-dimethyl-1,4-phenylene ether) having a number average molecular weight of about 20,000 and an intrinsic viscosity in chloroform at 25° C. of 0.48-0.49 dl.g. The olefin copolymers were EPDM rubbers commercially available from Exxon Chemical Company as VISTALON 3708 and VISTALON 7000, and an ethylene-propylene elastomeric polymer similarly available as VISTALON 719. The polyamide was a commercially available polyamide-6/6.

EXAMPLE 3-9

Mixtures of 49 parts of polyphenylene ether, 10 parts of olefin copolymer and various proportions of maleic anhydride were tumble mixed on a roll mill for 30 minutes and extruded at 288° C. on a Welding Engineers twin screw extruder at 400 rpm., with full vacuum vent. The extrudates were quenched in water, pelletized and dried, and then similarly blended and extruded with 41 parts of polyamide. The extrudates were injection molded at 288° C. into notched Izod test specimens and Izod impact strengths were determined according to ASTM method D256.

The proportions of maleic anhydride and test results are given in Table I, in comparison to two controls. In Control A, the polyphenylene ether and maleic anhydride were initially extruded, combined with the olefin copolymer and extruded a second time, and subsequently combined with the polyamide and extruded a third time. In Control B, the polyphenylene ether and olefin copolymer were initially extruded and the resulting blend was extruded with polyamide and maleic anhydride.

TABLE I

| Example | Olefin copolymer | Maleic anhydride, parts per 100 parts polyphenylene ether | Izod impact strength, joules/m. |
|---|---|---|---|
| 3 | VISTALON 3708 | 0.61 | 149.5 |
| 4 | " | 1.02 | 704.9 |
| 5 | " | 1.43 | 715.6 |
| 6 | " | 2.04 | 731.6 |
| 7 | " | 3.06 | 720.9 |
| 8 | VISTALON 7000 | 1.43 | 667.5 |
| 9 | VISTALON 719 | 1.43 | 165.5 |
| Control A | VISTALON 3708 | 1.43 | 85.4 |
| Control B | " | 1.02 | 16.0 |

EXAMPLES 10-18

Following the procedure of Examples 3-9, various polyphenylene ether extrudates with other ingredients were prepared, extruded with polyamide-6/6 and tested. The styrene-butadiene-styrene triblock copolymers employed in Examples 12-18 were KRATON products identified in Table II.

TABLE II

| Identification | G-1650 | G-1651 | G-1652 | D-1101 | D-1102 |
|---|---|---|---|---|---|
| Styrene/butadiene wt. ratio | 27:63 | 33:67 | 29:71 | 30:70 | 28:72 |
| Hydrogenated midblock | Yes | Yes | Yes | No | No |
| Mw: | | | | | |
| Styrene end block | 10,000 | 29,000 | 7,500 | 14,000 | 9,500 |
| Butadiene midblock | 54,000 | 116,000 | 37,500 | 64,000 | 47,000 |

The relevant parameters and test results are given in Table III.

TABLE III

| | Example | | | | | | | | |
|---|---|---|---|---|---|---|---|---|---|
| | 10 | 11 | 12 | 13 | 14 | 15 | 16 | 17** | 18 |
| Polyphenylene ether, parts: | | | | | | | | | |

TABLE III-continued

| | Example | | | | | | | | |
|---|---|---|---|---|---|---|---|---|---|
| | 10 | 11 | 12 | 13 | 14 | 15 | 16 | 17** | 18 |
| Unfunctionalized | 24.5 | 40 | 49 | 49 | 49 | 43 | 43 | 48 | 43 |
| Example 2 | 24.5 | — | — | — | — | — | — | — | — |
| High impact polystyrene*, parts | — | 13.3 | — | — | — | — | — | — | — |
| VISTALON 3708, parts | 10 | 13.3 | 5 | 5 | 5 | 8.4 | 8.4 | 3 | 8.4 |
| Maleic anhydride, parts | 0.5 | 0.47 | — | — | — | — | — | — | — |
| Fumaric acid, parts | — | — | 0.59 | 1.0 | 1.0 | 1.0 | 1.0 | 1.0 | 1.0 |
| Styrene-butadiene-styrene triblock copolymer, parts: | | | | | | | | | |
| G-1650 | — | — | — | — | — | 8.4 | — | — | — |
| G-1651 | — | — | — | — | — | — | 5 | 9 | — |
| G-1652 | — | — | — | — | — | — | — | — | 8.4 |
| D-1101 | — | — | 5 | 5 | — | — | — | — | — |
| D-1102 | — | — | — | — | 5 | — | — | — | — |
| Polyamide, parts | 41 | 33.3 | 41 | 41 | 41 | 41 | 41 | 41 | 41 |
| Izod impact strength, joules/m. | 726.2 | 427.2 | 640.8 | 640.8 | 640.8 | 801 | 801 | 747.6 | 801 |
| Heat distortion temperature, °C. at 0.46 MPa | 192 | — | 184 | 186 | 184 | 193 | 194 | 191 | 193 |

*American Hoechst 1897 rubber modified polystyrene.
**0.8 part hindered phenol stabilizer added.

What is claimed is:

1. A method for preparing a resinous composition which comprises:
   (I) intimately blending, at a temperature in the range of about 270°–350° C. (A) at least one polyphenylene ether, or a mixture thereof with at least one polystyrene; (B) at least about 0.5 parts by weight, per 100 parts of component A, of a functionalizing compound containing at least one carbon-carbon double or triple bond and at least one carboxylic acid group or functional derivative thereof; and (C) at least one unfunctionalized elastomeric olefin copolymer comprising a major proportion of structural units derived from ethylene and at least one $C_{3-8}$ 1-olefin; and
   (II) blending, at a temperature in the range of about 270°–350° C., the product of step I with (D) at least one polyamide.

2. A method according to claim 1 wherein the polyphenylene ether comprises a plurality of structural units having the formula

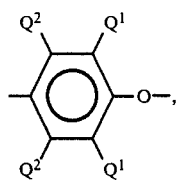

(I)

and in each of said units independently, each $Q^1$ is independently halogen, primary or secondary lower alkyl, phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$.

3. A method according to claim 2 wherein the functionalizing compound is maleic anhydride or fumaric acid.

4. A method according to claim 3 wherein component C is a copolymer of ethylene and propylene or of ethylene, propylene, and a non-conjugated diene.

5. A method according to claim 4 wherein the polyamide is a polyamide-6/6 or a polyamide-6.

6. A method according to claim 5 wherein component A is a poly(2,6-dimethyl-1,4-phenylene ether).

7. A method according to claim 6 wherein the proportion of component B is about 0.5–1.5 parts per 100 parts of component A.

8. A method according to claim 6 wherein steps I and II are achieved by melt blending.

9. A method according to claim 6 wherein the polyamide is a polyamide-6/6.

10. A method according to claim 6 wherein the polyamide is a polyamide-6.

11. A method according to claim 8 wherein component C is present in the amount of about 5–50% by weight based on components A and D.

12. A method according to claim 11 wherein there is also blended in step I about 5–50 parts, per 100 parts of component A, of a styrene-butadiene-styrene triblock copolymer as an impact modifier for the polyphenylene ether phase.

13. A method according to claim 12 wherein the butadiene midblock of said impact modifier has been selectively hydrogenated.

14. A method according to claim 11 wherein component C is a copolymer of ethylene, propylene and a non-conjugated diene.

15. A method according to claim 11 wherein component A is present in the amount of about 25–75% by weight of components A and D.

16. A method according to claim 6 wherein the polyphenylene ether has been functionalized by reaction with a compound containing at least two functional groups selected from the group consisting of (1) carbon-carbon double and triple bonds and (2) carboxylic acid groups or functional derivatives thereof, at least one of said carboxylic acid groups or functional derivatives thereof being present.

17. A resinous composition prepared by the method of claim 1.

18. A resinous composition prepared by the method of claim 4.

19. A resinous composition prepared by the method of claim 6.

20. A resinous composition prepared by the method of claim 9.

21. A resinous composition prepared by the method of claim 10.

22. A resinous composition prepared by the method of claim 12.

23. A resinous composition prepared by the method of claim 13.

24. A resinous composition prepared by the method of claim 14.

* * * * *